United States Patent [19]

Nakano et al.

[11] 3,971,606

[45] July 27, 1976

[54] WATER LUBRICATED BEARING DEVICE

[75] Inventors: Yoshiki Nakano; Heiichiro Nakamura; Tatsuo Fujita, all of Yokohama; Kanichi Nakamura; Masaaki Higo, both of Tokyo, all of Japan

[73] Assignee: Ishikawajima-Harima Jukogyo Kabushiki Kaisha, Tokyo, Japan

[22] Filed: May 21, 1974

[21] Appl. No.: 472,043

[30] Foreign Application Priority Data
Jan. 18, 1974 Japan................................. 49-8250

[52] U.S. Cl.................................. 308/238; 308/36; 308/239; 308/240; 308/DIG. 8; 308/DIG. 12
[51] Int. Cl.².................... F16C 27/02; F16C 33/20
[58] Field of Search........... 308/238, 239, 240, 4 R, 308/8, 36, DIG. 12, DIG. 8

[56] References Cited
UNITED STATES PATENTS

| | | | |
|---|---|---|---|
| 1,483,903 | 2/1924 | Masury | 308/238 X |
| 2,898,165 | 8/1959 | Patton | 308/239 |
| 3,362,765 | 1/1968 | Pierce | 308/238 |
| 3,424,503 | 1/1969 | Schulz | 308/238 X |
| 3,561,830 | 2/1971 | Orndorff, Jr. | 308/238 |
| 3,802,285 | 4/1974 | Williams | 308/238 X |
| 3,850,483 | 11/1974 | Roberts et al. | 308/4 R |

FOREIGN PATENTS OR APPLICATIONS 1,400,313  10/1968  Germany................................. 238/

Primary Examiner—Robert J. Spar
Assistant Examiner—Randolph A. Reese
Attorney, Agent, or Firm—Scrivener Parker Scrivener & Clarke

[57] ABSTRACT

Water lubricated bearing devices best adapted to be used in water or sea water are disclosed wherein a composite bearing member comprising an elastic bearing member lined with a thermoplastic resin compound is anchored to the inner wall of a bush fitted into a support member.

6 Claims, 10 Drawing Figures

WATER LUBRICATED BEARING DEVICE

BRIEF DESCRIPTION OF THE PRIOR ART

The present invention relates to a water lubricated bearing device which must support such a heavy load that the PV value must be taken into consideration in design and especially which is used at such a condition that the improper contact of the bearing occurs due to the dynamic bending and/or whirling of the rotary shaft rotating under the heavy and fluctuating load and/or the misalignment of the shaft components. The present invention may find a wide application in the journal and thrust bearings, which are lubricated by water, such as stern-tube bearings, strut bearings for ship propulsion, rudder stock bearings, bearings for dredge cutters, and shaft bearings of various water wheels and pumps.

As well known in the field, nowadays in a majority of the large marchant ships, for instance, the white metal lined oil-bath type stern-tube bearings are used instead of the conventional water lubricated stern-tube bearings, because of the poor performances of the latter. Since the allowable bearing pressure of the conventional water lubricated stern-tube bearings is limited to a relatively lower value, then their use is presently allowed to only a smaller size of ships. But there exists another problem on the said oil-bath type stern-tube bearings which are necessary to fit outboad shaft sealings consisting of some complex mechanisms. Upon the occurrence of any difficulty, the outboad shaft seals of the oil-bath type stern-tube bearings could be hardly mended at sea without resulting in serious damage or loss. Unlike the oil-bath type bearings, the water lubricated bearings favorably eliminate the use of the outboad shaft seal means.

SUMMARY OF THE INVENTION

In general, the water lubricated bearings have recently been used under severe conditions so that, it seems, there has been a strong demand that the performances of the bearings shall be improved so as to extend their wider applications and ensure the higher reliability, the longer service life of the bearings and also to be in compact in size.

The present invention was made to comply with the above demand.

DETAILED DESCRIPTION

Figure 10:
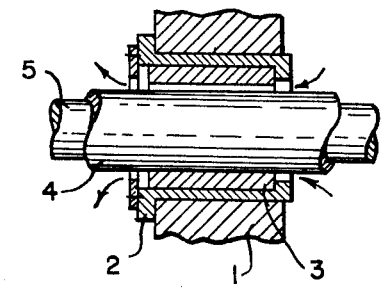
FIG. 10 is a schematic sectional view of a prior art water lubricated bearing device.

Referring to FIG. 10, illustrating a conventional water lubricated bearing device, reference numeral 1 denotes a bearing support member; 2, a bush; 3, a bearing member; 4, a sleeve; and 5, a rotary shaft shrinkage-fitted with and rotating in unison with the sleeve 4. Cooling water flows in the direction indicated by the arrows. On such a bearing device, due to the improper contact between the sleeve 4 and the bearing member 3 caused by the bend, whirling or misalignment of the rotary shaft 5, the excessive local bearing pressure tends to build up, thus resulting in the seizure (or abnormal abrasion and wear) of the bearing member 3 and the sleeve 4.

Under the above circumstances, (a) lignum vitae, (b) phenolic compound and (c) rubber have been used as materials of the bearing member 3 of the water lubricated bearing devices which must support a heavy and fluctuating load and in which the shaft rotates at a ralatively high peripheral speed. Experiences suggest the lignum vitae bearings have the following defects:

i. Since the elasticity of lignum vitae is poor, the excessive local bearing pressure build-up tends to occur very often due to the improper contact of the bearing, thus resulting in the abnormal wear-down, and furthermore the cavitation also tends to occur at the portion of the bearing surface where the slight floating of the rotary shaft is periodically produced due to the dynamical shaft bend and/or whirling actions, so that the erosion of the shaft sleeve and the bearing grows.

ii. Since lignum vitae is a natural wooden material, a limit exists to its supply and moreover its quality is substandard.

In case of the phenolic compound bearings, i. The resistivity of phenolic compound to wear is excellent, but the seizure is liable to occur and also for lack of its elasticity the local bearing pressure is excessively built up, resulting in the seizure and cavitation erosion.

ii. Since phenolic compound is in the nature of thermosetting and therefore its resistivity to heat is quite excellent, only a thin layer of bearing surface is charred in case of seizure so that the damages to the bearing member are slight. However, the temperature excessively rises in that case so that damage such as cracks is suffered on the shaft sleeve side.

In case of the rubber bearings, i. the resistivity of rubber to heat is poor so that in case of insufficient water lubrication following increased frictional heat generation the all-out damages to the bearing member are easily apt to occur.

ii. A high bearing pressure cannot be allowed so that the rubber bearings cannot be made compact in size.

iii. The rubber bearings tend to produce the stick-slip phenomenon with the result of noise when the rotational speed of the rotary shaft is low.

As described above, the conventional water lubricated bearings have certain defects or problems respectively in any case and cannot display the higher performances recently required in the water lubricated bearings.

The present invention was made to improve the bearing performances in consideration of the above defects or problems encountered in the conventional water lubricated bearings, and will become apparent from the following description of some preferred embodiments thereof taken in conjunction with the accompanying drawings.

Figure 1:
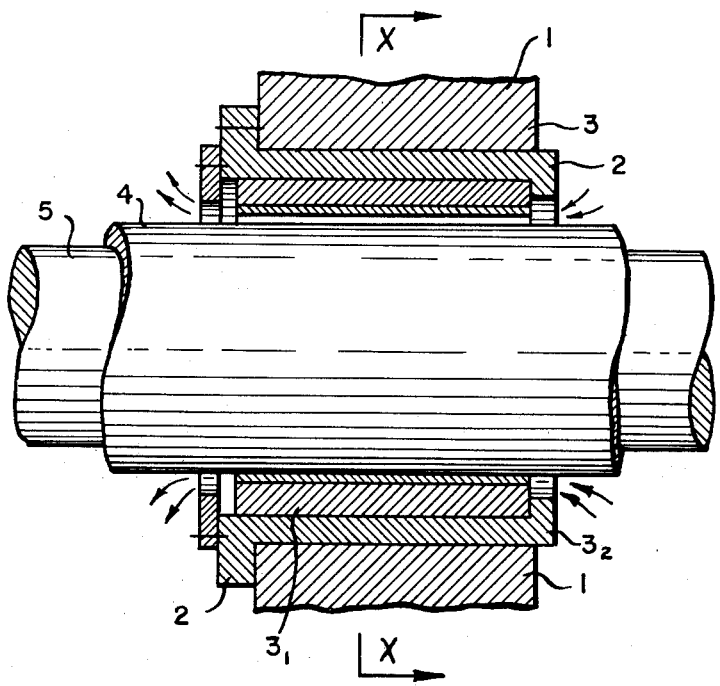
FIG. 1 is a schematic sectional diagram of a water lubricated bearing device in accordance with the present invention.

Referring to FIG. 1, a lining member $3_2$ is bonded with a suitable adhesive to an elastic bearing member $3_1$ such as an elastomer member which in turn is bonded to the inner wall of a bush 2 fitted into a bearing support member 1. Thus, a composite bearing member 3 is provided.

The lining member $3_2$ must have such less rigidity as to follow the elastic deformation of the elastic bearing member $3_1$, and must be made of such a material as to be heat-resistant to absorb temperature, in case of the siezure, if any, lest the temperature of the bearing surface 3 should rise to such a high temperature as to cause the surface flaws such as cracks to a sleeve 4. Hence there is selected as a material of the lining member $3_2$, a thermoplastic synthetic resin compound such as tetrafluoroethylene, polyamide, polyethylene, or polyacetal or a material consisting of such resins as described above as a base material, compounded with a suitable filler in the form of fibers or powder such as carbon, graphite, glass, bronze, or molybdenum bisulfide in order to attain the satisfactory bearing surface qualities. Unlike the case of the conventional phenolic compound bearings, the composite bearing member 3 of the bearing device in accordance with the present invention may be restrained from the temperature rise to an abnormally high level in case of the seizure, so that the serious damages to the shaft or shaft sleeve may be safely prevented. Furthermore since the lining member $3_2$ is made of the materials described above which are obtainable in relatively high resistivity to heat in comparison with that of lignam vitae or rubber and have the satisfactory self-lubrication property, the excellent bearing surface qualities against the seizure may be ensured.

Next as to the elastic bearing member $3_1$ it has such suitably given elasticity that may prevent effectively the bearing surface of the lining member $3_2$ from being subjected to the excess local bearing pressure due to the improper contact of the bearing caused by the bend, whirling, lateral movement or misalignment or the rotary shaft 5. It is essential the elasticity of the elastic bearing member $3_1$ must be chosen at moderate value and not to be too elastic. Otherwise in case of the too elastic bearing the critical speed of the whirling or lateral vibration of the shafting will be lowered to result usually in an undesirable trend in connection with the rated speed of the shafting and also centering of the bearing will be difficult. This will be described in detail hereinafter, taking the case of stern-tube bearings.

Figure 2:
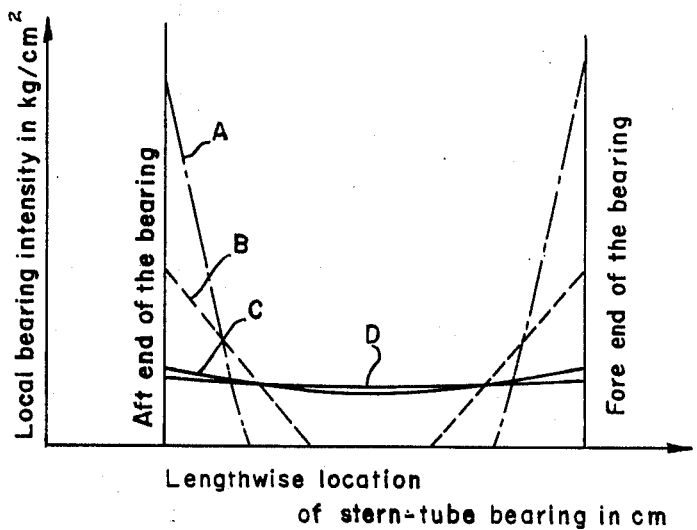
FIG. 2 is a graph illustrating the local bearing pressure distribution in the lengthwise direction in case of the stern-tube bearing.
Figure 3:
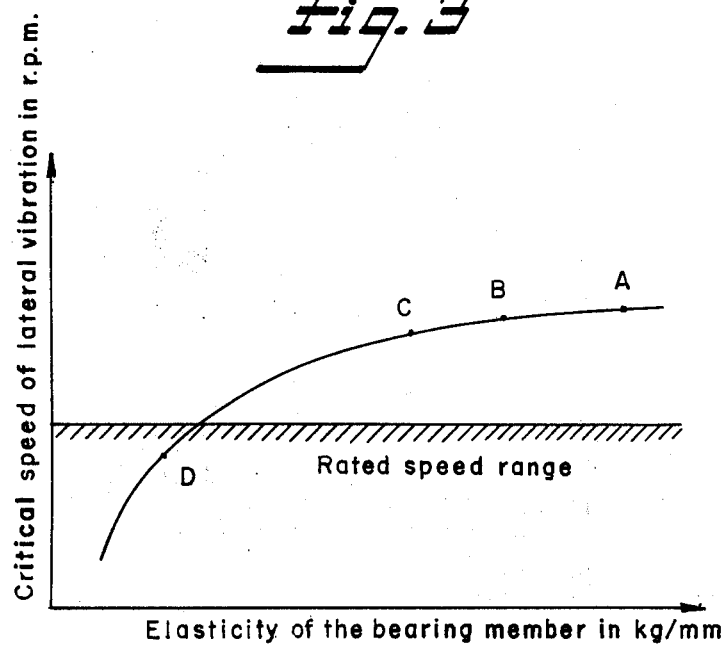
FIG. 3 is a graph illustrating the relation between the critical speed of lateral vibration and the elasticity of the bearing member in case of the stern-tube bearing.

Referring to FIGS. 2 and 3, reference characters A, B, C and D denote the characteristics of a conventional lignum vitae (or phenolic compound) bearing, a bearing using, for instance, tetrafluoroethylene compounded with carbon fiber as a filler, instead of lignum vitae, a bearing in accordance with the present invention using the same as B for a material of the lining member $3_2$, and a conventional rubber bearing, respectively. As obviously seen from FIG. 2, the occurrence of the excessive local bearing pressure due to the improper contact caused by, for instance, the bend of the rotary shaft 5 in the bearing C in accordance with the present invention is sufficiently suppressed as compared with the lignum vitae (or phenolic compound) bearing A and the tetrafluoroethylene bearing B, and the bearing intensity is substantially uniform as in the case of the rubber bearing D. As seen from FIG. 3, the critical speed of a lateral vibration of the bearing C of the present invention is substantially equal to those of the lignum vitae (or phenolic compound) bearing A and the tetrafluoroethylene bearing B, but the dangerous vibrations are produced in the rated r.p.m. range in case of the rubber bearing D.

Next referring to FIGS, 4–9, various embodiments of the bearing devices in accordance with the present invention will be described hereinafter.

Figures 4, 5:
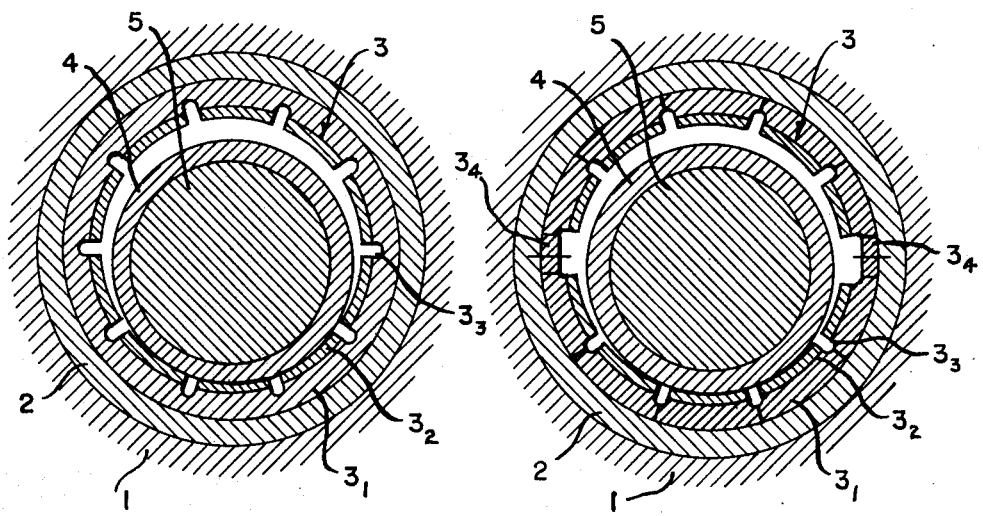
FIGS. 4–9 are sectional views taken along the line X—X in FIG. 1 and illustrating the various embodiments of the water lubricated bearing device in accordance with the present invention.

In the first embodiment shown in FIG. 4, a plurality of lubrication grooves $3_3$ are formed lengthwise in the inner surface of the lining member $3_2$ in order to flow water therethrough. All or some of these lubrication grooves $3_3$ are cut into or onto the elastic bearing member $3_1$ so that the lubrication grooves $3_3$ may define the free surfaces of the elastic bearing member $3_1$, dividing the lining member $3_2$ into separated sections, in order to permit effectively the elastic deformation of the composite bearing member 3.

The second embodiment shown in FIG. 5 is substantially similar in construction to the first embodiment shown in FIG. 4 except that the elastic bearing member $3_1$ is also sectioned along the lubrication grooves $3_3$. In assembly, the bearing segments each comprising the sectioned elastic bearing member lined with the sectioned lining member are arranged over the inner surface of the bush 2 and securely held in position by anchoring retaining plates $3_4$ with setscrews or the like to the bush 2. The second embodiment has therefore an advantage that the fabrication as well as disassembly or reassembly of the bearing may be much facilitated.

Figure 6:
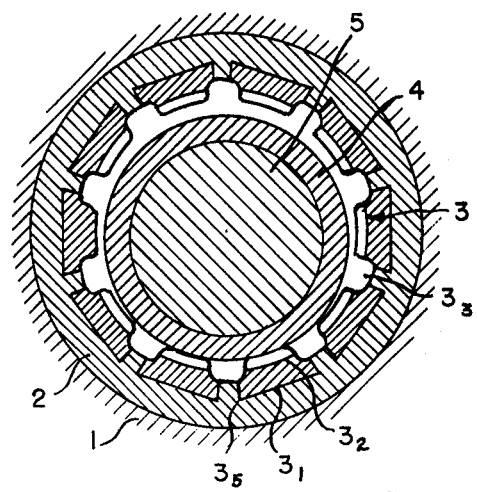

The third embodiment shown in FIG. 6 is substantially similar in construction to the second embodiment shown in FIG. 5 except that the bearing sections comprising the sectioned bearing member lined with the lining member are securely held in position by the dovetail joints to the bush 2. That is, a plurality of dovetails $3_5$ equal in number to the bearing sections or segments are formed lengthwise in the inner surface of the bush 2, and the mating dovetails of the elastic bearing sections or segments $3_1$ are fitted into the dovetails $3_5$. Therefore the bearing segments or sections may be more securely held in position as compared with the second embodiment. Since the configurations and dimensions of the dovetail joints may be standardized, the fabrication and reassembly of the composite bearings 3 may be much facilitated with the result of the reduction in investment and repair costs. Since the elastic bearing member $3_1$ is made of an elastic material, the bearing sections or segments may be easily fitted into the mating dovetails $3_5$ of the bush 2, and it is not required to machine the dovetails $3_5$ with a higher degree of accuracy.

Figure 7:
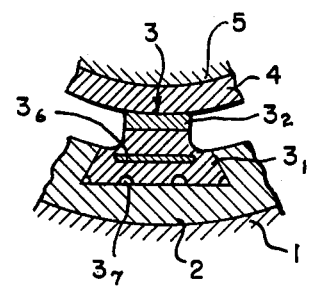

The fourth embodiment shown in FIG. 7 is a modification of the third embodiment shown in FIG. 6. A core member $3_6$ is inserted into and embedded in the elastic bearing member $3_1$ so that the latter may be prevented from being deflected or twisted when the bearing segments or sections are manufactured, assembled or disassembled. Such a core member is also applicable to the case of the second embodiment. Furthermore, a recess or recesses $3_7$ in a suitable configuration is formed in the surface of the dovetail of the bearing segment or section in contact with the bottom of the dovetail $3_5$ of the bush 2 so that the elasticity of the elastic bearing member $3_1$ may be suitably adjusted. Such a recess or recesses may be also applied to the surface of the bearing segment or section in case of the third embodiment, or to the surface of the same in contact with the inner surface of the bush 2 in case of the second embodiment.

Figure 8:
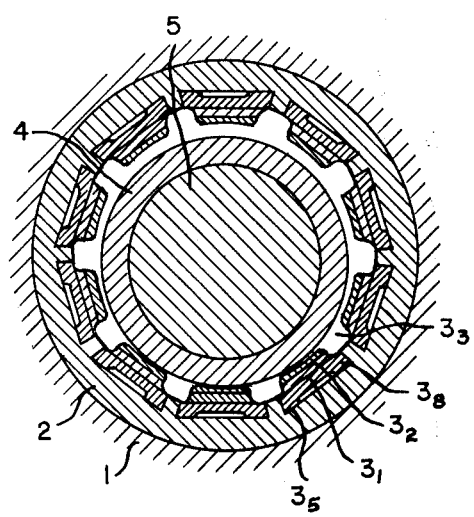

The fifth embodiment shown in FIG. 8 is substantially similar in construction to the third embodiment shown in FIG. 6 except that the portion of the dovetail $3_5$ of the bearing section or segment is composed of a rigid member $3_8$ which is securely bonded to the elastic bearing member 3, with such as an adhesive or other suitable means and made of a rigid material such as a metal or phenolic compound. Therefore the bearing segments or sections may be more securely anchored to the bush 2 and the deformation of the bearing segments or sections may be prevented during manufacturing, fabrication, disassembly or reassembly.

Figure 9:
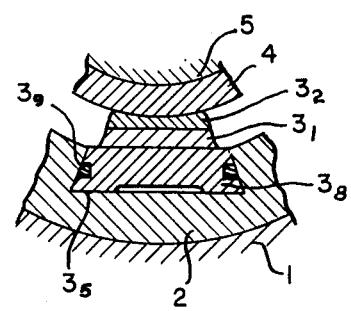

The sixth embodiment shown in FIG. 9 is substantially similar in construction to the fifth embodiment shown in FIG. 8 except that a recess or recesses are formed in either or both of each side surfaces of the dovetailed portion of the rigid member $3_8$ (and/or of each side walls of the dovetail of the bush 2) and elastomer retaining members $3_9$ are fitted into and securely bonded to the recess or recesses with a suitable adhesive. Therefore even when the rigid member $3_8$ is more loosely fitted into the mating dovetail $3_5$ than in case of the fifth embodiment, the bearing segment or section may be securely anchored in position by the elastomer retaining member $3_9$. Thus the sixth embodiment has the advantages that the assembly or disassembly of the bearing segments or sections may be much facilitated and that it is not required to machine the dovetails $3_5$ with a higher degree of accuracy.

So far the present invention has been discribed as being applied to the journal bearings, but it is to be understood that it may be also applied to the plain bearings such as thrust bearings which may be considered as a portion of the bearings described above, provided the diameter of the rotary shaft 5 is infinite. Furthermore the present invention may be also applicable to the bearings which are lubricated in such liquid similar to water or sea water, for instance in a solution containing soluble substances, as to serve to dissipate the heat generated from the bearing surfaces and to exercise lubrication effect to the bearing surfaces which are usually in a state of boundary lubrication. In addition it is to be understood that various modifications may be effected without departing from the true spirit of the present invention.

Thus the advantages of the bearings adapted to be used in water or the like in accordance with the present invention, which are brought about mainly by the functions of said composite bearing members and in addition by the capability of the various embodiments effected, may be reviewed as follows;

i. When the lining members are made of a thermoplastic resin compound they may be safely worn out such that the rotary shaft or sleeve is not damaged, even when the seizure of the bearing should occur. The replacement of the worn bearing may be easily and economically performed.

ii. A thermoplastic resin compound which forms the lining member is capable of being selected as such a material as to have self-lubricant property by itself, or to have a improved self-lubricant property by means of compounding it with a suitable kind of filler or fillers, and also to have the higher resistivity to heat than rubber or lignum vitae. Therefore the occurance of the seizure which is, as usual, locally initiated is well prevented so that the lining member may have a better bearing surface performance to the heavier load.

iii. The elastic supportability of the composite bearing member is effectively carried out by the elastic bearing member of a suitable elasticity, as well as by the lining member which has less rigidity than the bearing member due to the nature of the thermoplastic resin compound. A lining member having less rigidity than the bearing member allows the lining to follow the elastic deformation of the elastic bearing member, and also by the lubrication grooves which serve not only to lubricate the bearing but also more effectively permit the elastic deformation of the composite bearing member, as the lubrication grooves define the free deformation surfaces of the elastic bearing member and divide the lining member into separated sections as they float freely on the elastic bearing member. The excessive local bearing pressure build-up due to the malcontact may then be avoided and the uniform bearing load distribution may be also ensured. Moreover the possibility of cavitation erosion may be eliminated.

iv. When the improved bearing surface performance of the lining member as described in term (ii) and the uniform bearing load distribution attained by the composite bearing member as described in term (iii) effect combine to improve the bearing performances, the ability to withstand the load may be significantly improved, extending wider application to the heavier bearing load and ensuring not only the longer service life of the bearing but also its higher reliability. Furthermore, the length of the bearings may be reduced so that they may be made compact in size and economical; when the bearing length is so reduced, the excessive local bearing pressure build-up may be still more avoidable.

v. SInce the elastic bearing member is not required to perform the functions of a bearing surface member, it may be made of any suitably selected material or Young's modulus (or rubber hardness) or configuration as only a support member. The elasticity of the elastic bearing member may be so selected that the excessive local bearing pressure build-up due to the improper contact may be prevented and the decrease in resonant frequency in the lateral vibrations or whirling of the rotary shaft may be neglected.

vi. Since, unlike the lignum vitae bearing, the bearing materials are not natural but synthetic, there is no fear that the quality of the bearings is adversely affected by the shortage of the natural resources. The bearing materials with the uniform quality may be produced by the suitable quality control techniques.

vii. When the lining member is made of such a tetrafluoroethylene compound that its maximum coefficient of static friction is less than the coefficient of dynamic friction, possibility of the stick slip phenomena, which often occurs in case of the rubber bearing in a low speed range, may be deleted. Therefore such a lining member is best adapted for use in the bearings of naval ships in which the generation of noise must be minimized.

What is claimed is:

1. Water lubricated bearing means, comprising a tubular elastic composite bearing member formed of an elastomeric material of moderate elasticity; a plurality of segmental lining members arranged in circumferentially spaced relation on the inside surface of said bearing member, each of said lining members being formed of a thermoplastic synthetic resin compound selected from the group comprising tetrafluoroethylene, polyethylene or polyacetal and at least one filler, the spaces between said lining members defining lubricating grooves; tubular bushing means containing a cylindrical chamber in which said bearing means is concentrically mounted; and bearing support means containing a cylindrical bore in which said bushing means is concentrically mounted.

2. Water lubricated bearing means as defined in claim 1, wherein said composite bearing means comprises a sectional bearing member including a plurality of composite bearing segments obtained by sectioning the composite bearing member longitudinally along the water lubricating grooves, said composite bearing segments being attached to the inner surface of said bushing means with the adjacent composite bearing segments being adjacent and spaced from each other; at least one retaining member $3_4$ interposed between the adjacent composite bearing segments and in contact with the inner surface of said bushing means; and means connecting said retaining member with said bushing, whereby said composite bearing segments are securely anchored to the inner surface of said bushing means.

3. A water lubricated bearing device as defined in claim 2, wherein a core member is embedded in each of said elastic composite bearing member segments.

4. A water lubricated bearing device as defined in claim 3 wherein the surface of each of said elastic composite bearing member segments in contact with the inner surface of said bush is provided with a recess of a suitable configuration to vary the elasticity thereof.

5. A water lubricated bearing device as defined in claim 2 wherein the surface of each of said elastic composite bearing member segments in contact with the inner surface of said bush is provided with a recess of a suitable configuration to vary the elasticity thereof.

6. Water lubricated bearing means, comprising a tubular elastic composite bearing member formed of an elastomeric material of moderate elasticity; a plurality of segmental lining members arranged in circumferentially spaced relation on the inside surface of said bearing member, each of said lining members being formed of a thermoplastic synthetic resin compound including at least one filler, the spaces between said lining members defining lubricating grooves; tubular bushing means containing a cylindrical chamber in which said bearing means is concentrically mounted; and bearing support means containing a cylindrical bore in which said bushing means is concentrically mounted, said lining members being formed of a resin compound selected from the group comprising tetraflouroethylene, polyethylene or polyacetal and at least one filler selected from the group consisting of carbon, graphite, glass, bronze or molybdenum bisulfide.

* * * * *